United States Patent [19]

Venkateswar

[11] Patent Number: 5,459,492
[45] Date of Patent: Oct. 17, 1995

[54] METHOD AND APPARATUS FOR PRINTING STROKE AND CONTONE DATA TOGETHER

[75] Inventor: Vadlamannati Venkateswar, Dallas, Tex.

[73] Assignee: Texas Instruments Incoporated, Dallas, Tex.

[21] Appl. No.: 113,936

[22] Filed: Aug. 30, 1993

[51] Int. Cl.$^6$ .................................................... G01D 9/42
[52] U.S. Cl. .................. 347/253; 355/210; 358/448; 358/462; 395/109; 347/255
[58] Field of Search ................................. 355/210, 228, 355/229; 395/101, 109, 112; 358/448, 455, 458, 461, 462, 467, 296, 298, 300; 346/1.1, 76 L, 108, 160

[56] References Cited

U.S. PATENT DOCUMENTS

| | | | |
|---|---|---|---|
| 4,577,235 | 3/1986 | Kannapell et al. | |
| 4,673,953 | 6/1987 | Hecht | 346/108 |
| 4,677,571 | 6/1987 | Riseman et al. | |
| 4,956,619 | 9/1990 | Hornbeck | |
| 4,965,599 | 10/1990 | Roddy et al. | 346/160 |
| 5,142,303 | 8/1992 | Nelson | 346/108 |
| 5,185,852 | 2/1993 | Mayer | 395/109 |
| 5,223,857 | 6/1993 | Loce et al. | 346/108 |
| 5,225,911 | 7/1993 | Buckley et al. | 358/296 |

OTHER PUBLICATIONS

James D. Foley, et al., "Computer Graphics Principles and Practice, 2nd Ed." *Addison–Wesley Publishing Company*, 1990, pp. 92–94, and 132–134.

*Primary Examiner*—A. T. Grimley
*Assistant Examiner*—Sandra L. Brase
*Attorney, Agent, or Firm*—Julie L. Reed; James C. Kesterson; Richard L. Donaldson

[57] ABSTRACT

A method and apparatus for printing stroke and contone data together are provided in which data to be printed (102) is identified by a processor (100) as being either stroke or contone data. For contone data, processor (100) controls a light source (14), a spatial light modulator (12), and an optical photoconductive drum (16) to generate image quality graphics by using spatial light modulation in the process and cross-process directions. For stroke data, processor (100) controls light source (14), spatial light modulator (12), and optical photoconductive drum (16) for high resolution printing by using intensity modulation. Processor (100) is operable to control light intensities through the use of lookup tables stored in a memory (104).

20 Claims, 3 Drawing Sheets

5,459,492

METHOD AND APPARATUS FOR PRINTING STROKE AND CONTONE DATA TOGETHER

CROSS-REFERENCE TO RELATED APPLICATIONS

This application is related to the following copending U.S. applications assigned to Texas Instruments Incorporated: Ser. No. 08/100,892, "Method and Apparatus for Spatial Modulation in the Cross-Process Direction, " TI-17829, filed Jul. 30, 1993; Ser. No. 08/038,398, "Process and Architecture for Digital Micromirror Printer," TI-17632, filed Mar. 29, 1993; and Ser. No. 08/038,391, "Gray Scale Printing Using Spatial Modulators," TI-17611, filed Mar. 29, 1993.

TECHNICAL FIELD OF THE INVENTION

This invention relates generally to the field of printing, and more particularly to a method and apparatus for printing stroke and contone data together.

BACKGROUND OF THE INVENTION

Hard copy devices, such as printers, generally print two kinds of data. The first type of data is stroke data, usually text and graphics data. The second type of data is continuous tone ("contone") data, which is usually image data, for example, a data representation of a photographic image.

High quality rendering of stroke data requires a printer that can produce a spatial resolution of 600 dots per inch ("dpi") or more. This resolution is required, for example, to reduce jaggedness of diagonal edges or to reproduce fine seriphs in text.

Contone data, on the other hand, does not require such high spatial resolution, but requires a printer than can produce gray shades. Indeed, if the printer is capable of producing 256 gray shades (which is typical intensity resolution of image scanners), a 200–250 dpi printer will generally suffice. Such a printer provides appropriate spatial resolution for the human eye to perceive smooth shades.

Unfortunately, most existing printers are binary printers that can reproduce only two gray shades, black and white. These printers simulate more gray shades by logically combining several dots into cells and relying on the spatial integration property of the human eye to stimulate smooth shades. As an example, a 3200 dpi printer can achieve appropriate gray shades by forming cells from 16×16 arrays of dots, resulting in 200 cells per inch (sometimes referred to as lines per inch). By controlling the number of dots that are black (or white) in this array, each cell can represent up to 257 gray levels (0 through 256, with 256 represented by all dots being black). The spatial resolution of the human eye will perceive smooth shades with such a printer.

Thus, binary printers reproduce high quality contone data only at an extremely high resolution. To produce both contone and stroke data, therefore, the resolution is defined by the contone image requirements. Consequently, the stroke data is printed at a higher resolution than needed. Furthermore, printing at the high resolution needed for contone data with existing systems makes them expensive.

Therefore, a need has arisen for a printer that can print both stroke and contone data at the resolution of stroke data.

SUMMARY OF THE INVENTION

In accordance with the teaching of the present invention, a method and apparatus for printing stroke and contone data together is provided which substantially eliminates or reduces disadvantages and problems associated with prior art printers and printing techniques.

In particular, a method of printing both stroke and contone data together is disclosed in which data to be printed is identified as either contone data or stroke data. The contone data is then rendered with intensity modulation and spatial modulation in the process and cross-process directions, and the stroke data is rendered with intensity modulation. In a particular embodiment of the present invention, contone data is rendered by reflecting the light from predetermined individual elements of a plurality of rows onto predetermined phases of pixels of a photoconductive drum, the predetermined phases rendering the pixels at image quality gray scale levels. Stroke data is rendered by reflecting the light from predetermined individual elements onto predetermined phases of the photoconductive drum, the predetermined phases rendering the stroke data at high resolution.

A printer is also disclosed in which a light source shines light on a spatial light modulator that has a plurality of rows of individual elements. A photoconductive drum is operable to rotate in a process direction and has predefined pixels with phases operable to receive light reflected from the spatial light modulator. A processor is provided that is operable to control the individual elements such that for contone data, the pixels are rendered at image quality gray scale levels, and for stroke data, pixels are rendered at high resolution.

An important technical advantage of the present invention is that the different requirements of stroke and contone data are satisfied by using different methods to render them by exploiting spatial and intensity modulation capabilities of a DMD based printer.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
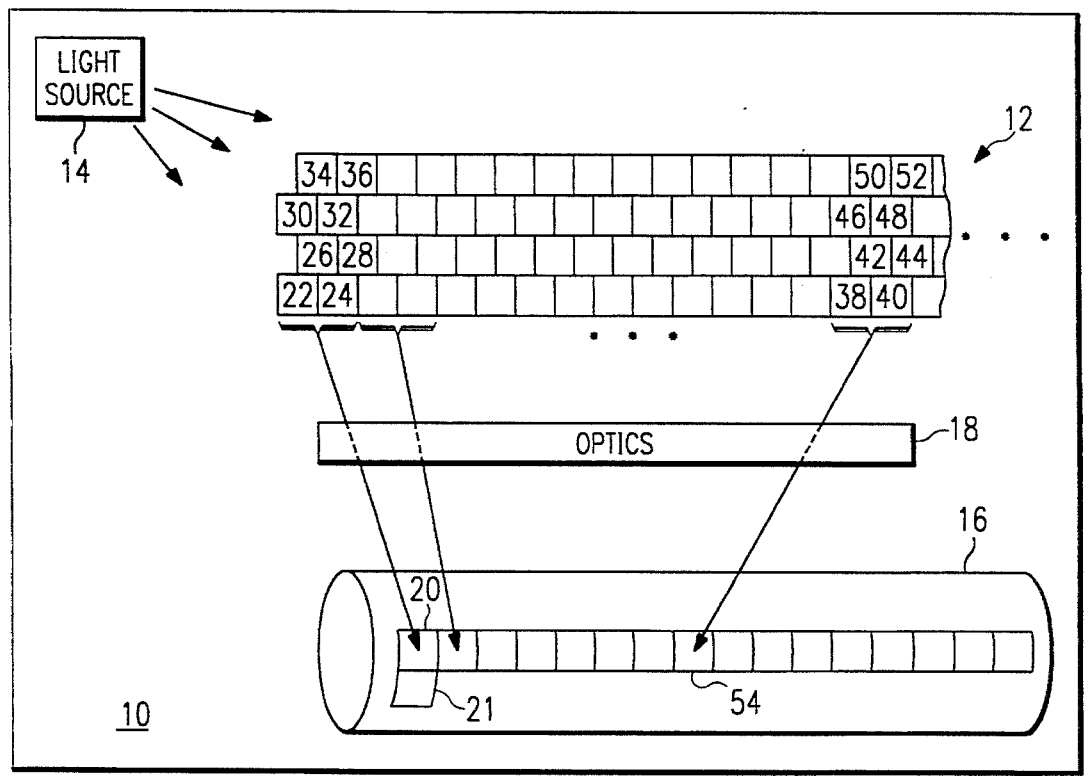
FIG. 1 illustrates a block diagram of a printer constructed according to the teachings of the present invention.

FIG. 1 illustrates a printer 10 constructed according to the teachings of the present invention. As shown in FIG. 1, a spatial light modulator (SLM) having individual elements making up an array 12 is provided. In a particular embodiment, array 12 comprises an array of DMDs. Throughout this description, individual elements of the array 12 will be referred to as mirrors. Array 12 may comprise an array of DMDs constructed as disclosed in U.S. Pat. No. 4,956,619, "Spatial Light Modulator," which is herein incorporated by reference.

As shown in FIG. 1, each row of array 12 is staggered, such that individual mirrors (elements) are offset from row to row. This offset will be exploited, as discussed below, to allow for generation of many gray scales for the printing of image data and for the printing of smooth edges for graphics data. Only a portion of array 12 is shown for clarity, it being understood that array 12 may include more rows or columns, as particular applications require.

Light from a light source 14 is reflected by array 12 either onto or off of OPC drum 16. Light source 14 may comprise a light-emitting diode. Light from array 12 may be reflected directly onto OPC drum 16 or focused through optics 18.

As shown in FIG. 1, light received from array 12 falls on OPC drum 16. Only a line of logical pixels is shown for clarity, it being understood that several lines of pixels can be simultaneously illuminated by the DMD array. Each of these pixels will be illuminated and thereby either charged or discharged for toner attraction. The drum 16 will then rotate over the page to be printed, and the toner will be transferred from the drum 16 to the page, the line of pixels printing a line on the page.

For the illustrated example, we will assume that the position (ON or OFF) of the mirrors in the array are updated for every one-quarter of a pixel drum movement. Other update speeds are possible, without departing from the scope of the invention. With this scheme, as shown in FIG. 1, an exemplary pixel 20 receives light from mirrors 22–36 of array 12. The light is received from each row of mirrors at different time instances as the drum rotates. Likewise, mirrors 38–52 reflect light onto pixel 54 of OPC drum 16. Pixel 21 is also shown, and will be discussed below. Pixel 21 will be exposed by mirrors 22–36 as OPC drum 16 rotates.

Figure 2A:
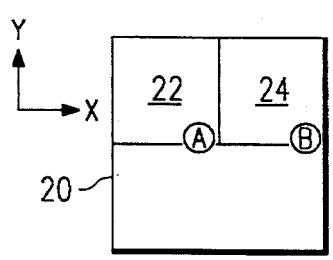
FIGS. 2a–2h illustrate various phases of a pixel to be printed according to present invention.

FIGS. 2a–2h illustrate light received at pixel 20 from each of the mirrors 22–36. As shown in FIG. 2a, light from mirrors 22 and 24 first impinges on the top of pixel 20. In a particular embodiment, the mirrors of array 12 shine light on an area approximately ¼ the area of pixel 20. For example, pixel 20 may be 1/300 of an inch by 1/300 of an inch, whereas the light from mirror 22 may be 1/600 of an inch by 1/600 of an inch. It should be understood that other sized and shaped pixels and mirrors are possible, or the effective size of the mirrors may be altered through optics 18, without departing from the intended scope of the invention.

Figure 2B:
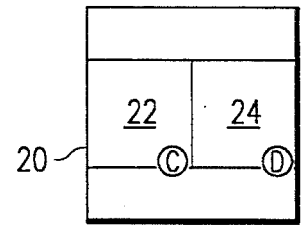

The particular area on pixel 20 on which light from any one mirror falls is referred to as a phase. Thus, as shown in FIG. 2a, light from mirrors 22 and 24 fall on phases A and B, shown by the circled A and B. The duration for which the light falls can be controlled by switching the mirrors OFF or alternatively switching the light source OFF. As shown in FIG. 2b, as time goes on and the OPC drum 16 rotates, in this example by a quarter of a pixel, light from mirrors 22 and 24 falls on phases C and D.

Figure 2C:
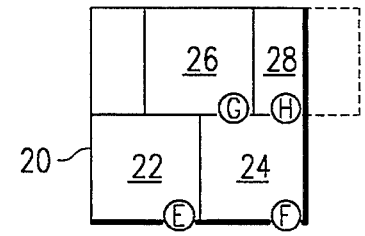

As shown in FIG. 2c, as OPC drum 16 continues to rotate, light from mirrors 22 and 24 falls on phases E and F, and light from mirrors 26 and 28 falls on phases G and H. As can be seen in FIG. 2c, phase H falls half on pixel 20 and half on the adjacent pixel of OPC drum 16. This light falling on the adjacent pixel can be handled in one of two ways. First, it can be taken into account in determining the gray scale to be generated in the adjacent pixel. Thus, if the gray scale of the adjacent pixel is to be, for example, level 200 of 256 gray levels, the amount of light received on that pixel from phase H can be taken into account. Alternatively, the light received from phase H on the adjacent pixel can be disregarded. Indeed, if the adjacent pixel is to be completely white, then this is the only alternative, and there will be some blur between pixels.

Figure 2D:
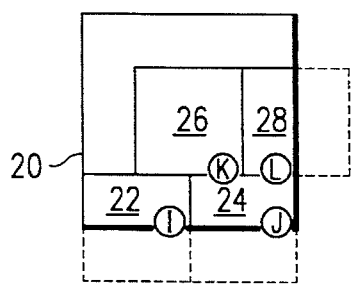

As shown in FIG. 2d, as OPC drum 16 continues to rotate, the light from mirrors 22 and 24 falls on phases I and J. As discussed above in connection with FIG. 2c, phases I and J overlap on to the pixel of the next line of OPC drum 16. This overlap can either be taken into account in determining the gray scale to be generated on that pixel, or disregarded. The light from mirrors 26 and 28 falls on phases K and L.

Figure 2E:
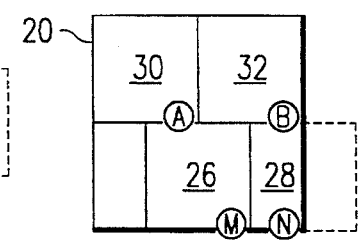
Figure 2F:
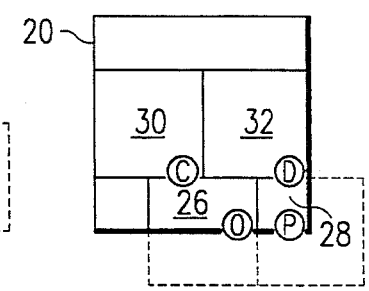

As shown in FIG. 2e, as OPC drum 16 continues to rotate, the light from mirrors 26 and 28 falls on phases M and N, with the overlap being handled as discussed above. Furthermore, light from mirrors 30 and 32 falls on phases A and B, as shown in FIG. 2e. Furthermore, at this time light from mirrors 22 and 24 fall on phases A and B of pixel 21. As shown in FIG. 2f, light from mirrors 26 and 28 next falls on overlap phases 0 and P, and the light from mirrors 30 and 32 next falls on phases C and D.

Figure 2G:
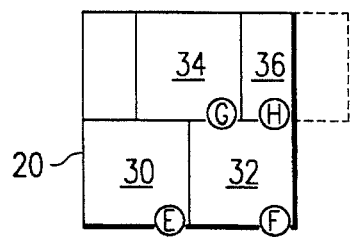
Figure 2H:
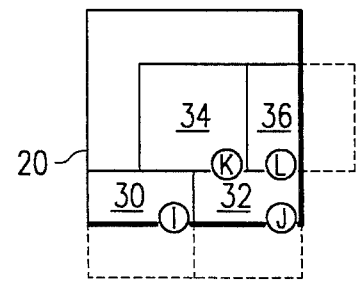

As shown in FIG. 2g, light from mirrors 34 and 36 next falls on phases A and H and light from mirrors 30 and 32 on E and F. Next, as shown in FIG. 2f, as the OPC drum continues to rotate, light from mirrors 34 and 36 falls on phases K and L and those from 30 and 32 on I and H.

Intensity modulation is achieved at each phase by choosing to turn the mirror ON or OFF (the ON position corresponds to the case where the light is reflected on the OPC pixel and the OFF position corresponds to the case where the light is reflected away from the OPC). As an example with the embodiment of FIGS. 2a–2h, three levels of exposure may be generated for each phase by exposing each phase zero, one, or two times. For example, to generate an exposure level of one in phase A, mirror 22 would be ON in FIG. 2a, but mirror 30 would be OFF for FIG. 2e.

More exposure levels are also possible by intensity modulation with amplitude modulation of the light source, which is, for example, an LED. For example, the entire array could be exposed at a certain base exposure level (1) for FIGS. 2a–2d, and at twice that level (2) for FIGS. 2e–2g. This cycle of intensity levels is repeated in a periodic fashion. With this scheme, four levels of exposure (0, 1, 2, and 3) can be generated in each phase. For example, to generate a level of 3 in phase A, mirror 22 would be switched ON in FIG. 2a and mirror 30 in FIG. 2e. Many more exposure intensity levels can be generated by using more rows of DMDs and more light source levels.

Copending U.S. patent application Ser. No. 08/100892, filed Jul. 30, 1993, and entitled "Method and Apparatus for Spatial Modulation in the Cross-Process Direction," which is herein incorporated by reference, discloses in detail the techniques by which the apparatus of FIG. 1 may be used to generate many shades of gray for the printing of contone data. As described in that application, the arrangement of array 12 is exemplary, and other arrangements may also be used. Generally speaking, that application describes generating many shades of gray by integrating light from all of the phases of a particular pixel, with phase locations in both the process and cross-process directions.

Note that the size of a phase in the process direction is determined by the time the light source is ON when that phase is exposed. FIGS. 2a–2g show the ideal case when the exposure is instantaneous. In the extreme case when the light source is on for the entire duration between two successive data load times, each phase will be about ¾ of a pixel wide, leading to overlap, for example between phases A and E. Thus, the size of the phases can also be varied or modulated for generating gray scales. This approach, referred to as pulse duration modulation, is described in copending U.S. patent application No. 08/038,398, filed Mar. 29, 1993, entitled *"Process and Architecture for Digital Micromirror Printer,"* (TI-17632) assigned to Texas Instruments Incorporated and which is incorporated herein by reference. Though the examples shown in this application show constant duration phases, it should be understood that the present invention may also use pulse duration modulation.

With the present invention, contone data, as well as stroke data, can be printed together at different resolutions, thus allowing for the proper printing of both types of data. This is made possible by taking advantage of the fact that raster image processors ("RIPs") can distinguish between text and contone data. RIPs process printing languages, such as the postscript language, which require clear identification of different types of data, such as image data through use of the image operator, text data through use of the show operator, and graphics data through use of the stroke operator. Thus, with the present invention the RIP is programmed to render image data at a resolution which allows for the generation of many shades of gray, such as 300 dpi, while rendering text and graphics data at high resolution, such as 600 dpi. This is accomplished by taking advantage of the structure of array 12, as will be discussed.

Figure 3:
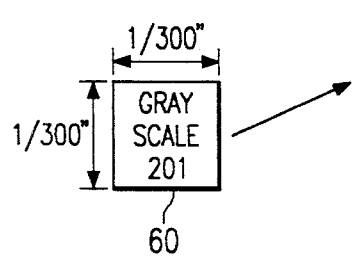
FIG. 3 illustrates lookup tables according to the teachings of the present invention.
Figure 3:
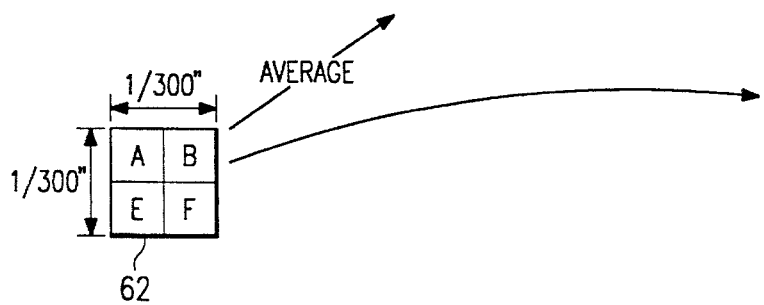

FIG. 3 illustrates two lookup tables that are used by a RIP to render stroke and contone data. For contone data, lookup table A is used. Lookup table A provides the intensity levels that must fall on each phase of a pixel to generate the appropriate gray scale. The phases correspond to those of FIGS. 2a–2h, and gray scale levels are rendered by integrating the light from the phases in both the process and cross-process directions. Pixel 60 illustrates a pixel of contone data, for example, at ⅓₀₀ of an inch, to be printed at a gray scale level of 201. A raster image processor uses lookup table A to determine the particular light intensities that should fall on each of the phases of pixel 60 to generate the gray scale level of 201.

In particular, to generate gray scale 201 in pixel 60, the specific exposure levels desired for different phases are obtained through lookup table A. These tables can be derived experimentally or through modeling. The table entries are translated into mirror settings (ON or OFF) based on the light source intensity cycle. For example, assuming the light source is modulated periodically from one, to two, to four, to eight times a base intensity level, the mirrors that expose phase A may be ON for levels 2 and 8 and OFF for levels 1 and 4 to generate a total intensity of 10 in phase A.

Stroke data is rendered through use of lookup table B, shown in FIG. 3. Lookup table B provides the intensity level that must fall on a phase to render it at a particular gray shade. As illustrated, pixel 62 is divided into four phases, phases A, B, E, and F, corresponding to the phases in FIGS. 2a and 2c. These phases are of a resolution high enough to render high quality stroke data, for example, ⅙₀₀ of an inch. With existing optical photoconductive technology, dots of the size of about ⅙₀₀ of an inch can be rendered at about 8–32 shades of gray. Thus, the intensity required to generate the appropriate shades of gray for phases A, B, E, and F, can be obtained from lookup table B. Thus, for example, if phase A were to be rendered at a gray scale level of 30, an intensity level of, for example, 7 would be directed to that phase. Likewise, if phase F is to be at a gray scale of 100, an intensity level of 15 would be directed to that phase. Although 256 gray shades index into the lookup table B, fewer intensity levels are output from the lookup table due to the above mentioned toner limitations.

In the example described for stroke data, the stroke data is rendered by using the four phases A, B, E, and F of pixel 62. With such an arrangement, the other phases of pixel 62 are inactive, and stroke data is rendered at twice the spatial resolution of contone data. This arrangement is shown for convenience, it being understood that other arrangements are also possible. As discussed above, for example, pixel 62 can include many other phases, for example phases C, D, and G-P. With the present invention, any of these phases may be used to render the stroke data. By using phases other than just phases A, B, E, and F, the stroke data will be rendered at the same overall resolution, but can be addressed at a finer resolution, due to the offset of the rows of array 12. This fine addressing is discussed in "Method and Apparatus for Spatial Modulation in the Cross-Process Direction," incorporated above. Furthermore, it should be understood that the present invention works without staggering of the rows of array 12. It should be noted that dithering or half-toning schemes can be used in conjunction with the above methods, in particular for rendering stroke data which does not exploit spatial modulation.

Some input contone data may be received at 600 dpi resolution, and such contone data can be handled in at least three ways to generate gray shades. In one alternative, the 600 dpi contone data can be rendered through use of lookup table B, and use of the four phases shown in connection with pixel 62 of FIG. 3, which may also be combined with some dithering scheme. Second, the gray scale of each of the 600 dpi data points can be averaged and then rendered through use of a lookup table such as lookup table A. For example, if the contone data is received at 600 dpi, then there are four data points for each ⅓₀₀ of an inch pixel. The gray scale for each of these four data points can be averaged (for example, arithmetically) to derive a gray scale for the ⅓₀₀ of an inch pixel. This averaged gray scale can then be rendered through use of lookup table A, as discussed above. As a third alternative, this data can be subsampled by half (after smoothing with a low pass filter to prevent aliasing) to 300 dpi resolution, and rendered through use of lookup table A.

Many applications require both high resolution and many shades of gray. An example is the printing of graphics data, such as that for geometric shapes with a solid, patterned, or gradient fill. It is desirable to allow the rendering of many shades of gray within the geometric shape, while providing high resolution at the edges to prevent jagged appearing edges. The above discussion describes how contone and stroke data, once identified as such, are handled by the RIP, the array 12, and the OPC drum 16. Following is a discussion of how the data is so identified, and then printed.

Figure 4:
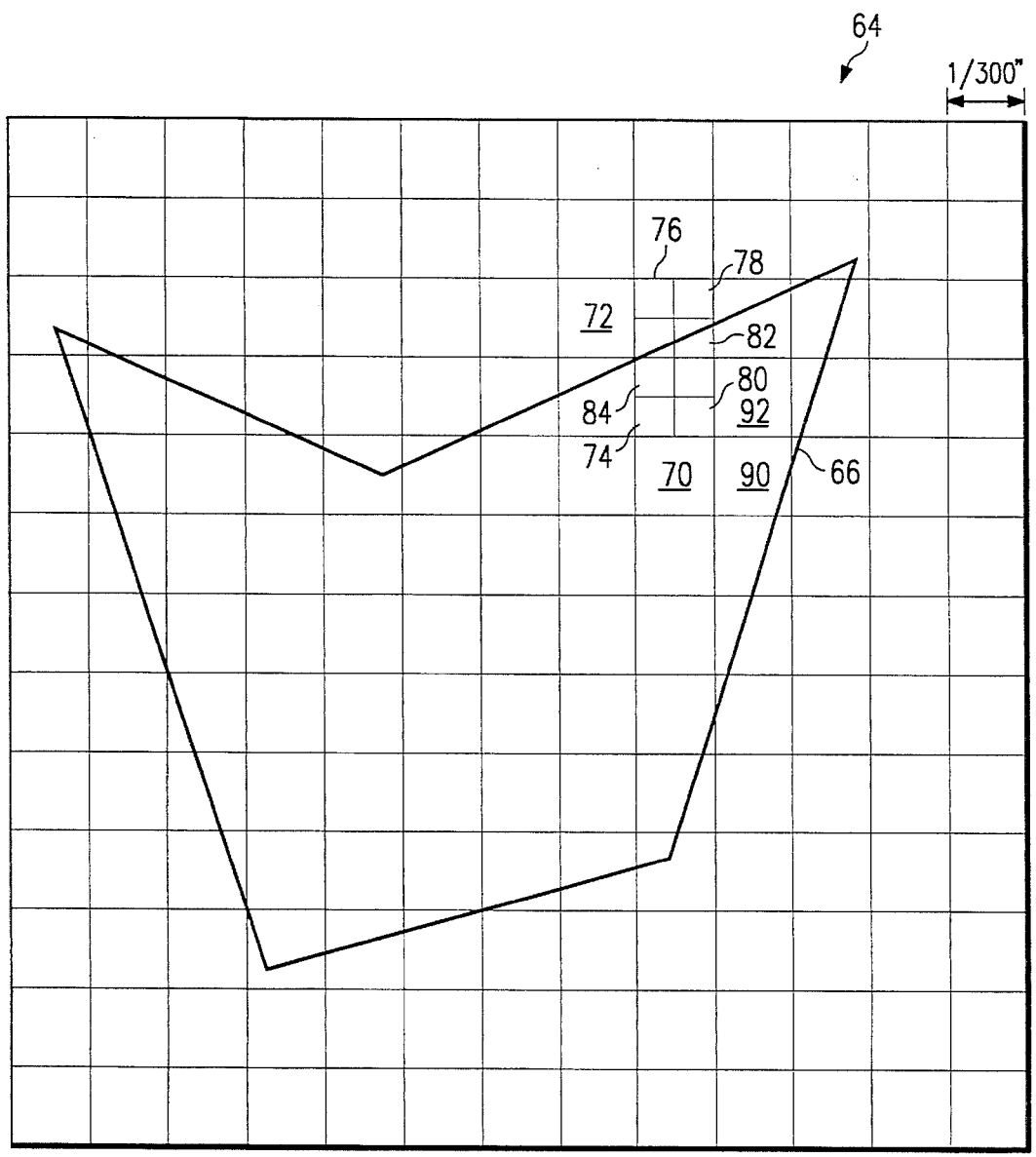
FIG. 4 illustrates a polygon printed according to the teachings of the present invention.

FIG. 4 illustrates the technique by which the present invention accomplishes the rendering of many gray shades while allowing for high resolution printing of stroke data. As shown in FIG. 4, an array 64 of logical pixels is shown, as they would be mapped on a piece of paper. As an example, the size of these pixels is ⅓₀₀ of an inch. A polygon 66 is shown as printed on the array. Processors, such as raster image processors, can be programmed to determine which pixels are inside of, outside of, or on the perimeter of a particular geometric shape. This technique, known as scan conversion, has been described in Foley, et al., *Computer Graphics: Principles and Practice, 2nd Edition*, Addison-Wesley Publishing Company, 1992, pp. 92–94. Generally speaking, this technique uses the geometric formula of an object, and pixel mapping, to determine whether a pixel is inside, outside, or on a shape.

Thus, pixels within the polygon, such as pixel 70, will be treated as if they were contone data, and printed as discussed above, for example using 16 phases. Likewise, pixels outside of the polygon, such as pixel 72, will not be rendered. Pixels on the edge, such as pixels 74 and 76, will be treated as stroke data, and rendered at a high resolution, for example, a resolution of 1/600 of an inch, as discussed above.

To accomplish this high resolution rendering with the present invention, each 1/300 of an inch pixel is divided into smaller phases, for example, four 1/600 of an inch phases. Phases that fall outside the polygon, such as phase 78, will not be rendered. Phases within the polygon that do not fall on its perimeter, such as phase 80, will be rendered at a stroke gray scale as close to the desired gray scale as possible. As discussed previously, varying technologies offer between 8 and 32 shades of gray for high resolution pixels. Thus, the gray shade of phase 80 can be made as close as possible to the desired gray shades by reproducing the intensity level that best approximates the shade.

Anti-aliasing techniques can also be used to determine the gray shades of the 1/300" pixels and the 1/600" phases. Such techniques are known in the art and have been described in Computer Graphics: *Principles and Practice*, pp. 132–134. Once the gray shade of a phase of a pixel on the perimeter is determined, it can be approximated through the use of lookup table B in FIG. 3. As an example of an anti-aliasing technique, the percentage of the phase that is inside the perimeter of the polygon 66 is determined. This percentage is then multiplied by the desired gray scale to determine the gray scale to be rendered at the phase on the perimeter. For example, if phase 82 of polygon 66 is to be rendered at a gray level of 60, and assuming half of phase 82 is inside the polygon, then that phase can be rendered at ½ times 60, or 30. Using lookup table B in FIG. 3, this translates to a desired intensity level of 7 at that phase.

Phases other than A, B, E, and F can be used at the subpixel level on the perimeter to further smooth out jaggies as was discussed in copending U.S. patent application Ser. No. 08/100,892, "Method and Apparatus for Spatial Modulation in the Cross-Process Direction" (TI-17829).

Figure 5:
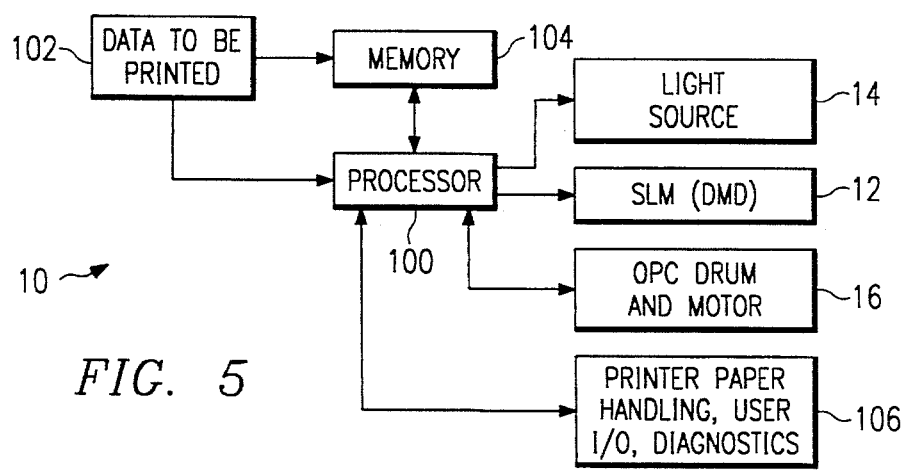
FIG. 5 illustrates a block diagram of the circuitry of a printer constructed according to the teachings of the present invention.

FIG. 5 illustrates a block diagram of the circuitry for a printer 10 constructed according to the teachings of the present invention. As shown in FIG. 5, a processor 100 receives data to be printed from block 102 either directly or through memory 104. Block 102 may represent any device that can output data to be printed, such as a personal computer. The memory 104 may be used to buffer data to be printed from block 102 or may store other data, such as pre-programmed data, for later printing. Memory 104 also includes instructions for controlling processor 100, as well as lookup tables, such as those discussed in connection with FIG. 3. Processor 100 is coupled to light source 14, array 12, and OPC drum and motor 16. Processor 100 is also coupled to printer paper handling, user I/O, and diagnostics block 106.

In operation, processor 100 processes the data to be printed by controlling light source 14 and array 12. For example, after determining that a pixel is to be contone data, processor 100 will determine the gray scale that must be written to that pixel, and with the aid of lookup tables controls the particular mirrors of array 12 and light source 14 to direct the appropriate intensity at different phases of the pixel. Processor 100 also controls the rotation of the OPC drum and the paper handling, user I/O and diagnostics as required by the printing system.

Although the present invention has been described in detail, it should be understood that various changes, substitutions, and alterations can be made without departing from the spirit and scope of the invention as defined by the appended claims.

What is claimed is:

1. A method of printing both stroke and contone data together, comprising the steps of:

identifying data to be printed as either contone data or stroke data;

rendering the contone data with spatial modulation in the process and cross-process directions; and rendering the stroke data with intensity modulation wherein said rendering the contone data and said rendering the stroke data steps are accomplished with a light source and a spatial light modulator.

2. The method of claim 1, wherein said step of identifying data comprises the steps of:

determining whether the location of the data is inside an edge or on the edge of an object to be printed; and identifying the data as contone if inside the edge and stroke if on the edge.

3. The method of claim 2, and further comprising the step of performing anti-aliasing on the stroke data.

4. The method of claim 1, wherein the contone and stroke data are rendered through use of lookup tables stored in a memory.

5. A method of printing both stroke and contone data together, comprising the steps of:

identifying data to be printed as either contone data or stroke data;

shining light on a spatial light modulator, the spatial light modulator having a plurality of rows of individual elements;

for the contone data, reflecting the light from predetermined individual elements of a plurality of rows onto predetermined phases of pixels of a photoconductive drum operable to rotate in a process direction, the predetermined phases rendering the pixels at image quality gray scale levels;

for the stroke data, reflecting the light from predetermined individual elements onto predetermined phases of the photoconductive drum, the predetermined phases rendering the stroke data at high resolution;

attracting toner to the phases, the amount of toner attracted to a particular phase being based on the amount of light that has fallen on that phase; and transferring the toner to a print medium.

6. The method of claim 5, wherein the stroke data is rendered at each pixel by reflecting light onto less than all phases of the pixel.

7. The method of claim 5, wherein said step of identifying data comprises the steps of:

determining whether the location of the data is inside an edge or on the edge of an object to be printed; and identifying the data as contone if inside the edge and stroke if on the edge.

8. The method of claim 7, and further comprising the step of performing anti-aliasing on the stroke data.

9. The method of claim 5, wherein the contone and stroke data are rendered by controlling the individual elements through use of lookup tables stored in a memory.

10. The method of claim 5, wherein the rows are staggered such that there are at least two phase locations in the cross-process direction for each pixel.

11. The method of claim 5, wherein said step of shining comprises pulsing the light such that each individual element is operable to reflect light on at least two phase locations in the process direction of a respective pixel.

12. The method of claim 5, and further comprising the step of periodically changing the intensity of the light.

13. The method of claim 5, wherein said step of shining comprises pulsing the light such that each individual element is operable to reflect light on at least two phase locations in the process direction of a respective pixel, and further comprising the step of periodically changing the intensity of the light.

14. The method of claim 5, wherein said step of reflecting comprises switching the individual elements such that each individual element is operable to reflect light on at least two phase locations in the process direction of a respective pixel.

15. The printer of claim 14, wherein said rows are staggered such that there are at least two phase locations in the cross-process direction for each pixel.

16. A printer, comprising:

a light source;

a spatial light modulator operable to receive light from said light source, said spatial light modulator having a plurality of rows of individual elements;

a photoconductive drum operable to rotate in a process direction and having predefined pixels with phases operable to receive light reflected from predetermined individual elements of a plurality of rows;

a processor operable to control said individual elements such that for contone data, light is reflected from predetermined individual elements of a plurality of rows onto predetermined phases of pixels of said photoconductive drum to render the pixels at image quality gray scale levels; and said processor also being operable to control said individual elements such that for stroke data, light is reflected from predetermined individual elements onto predetermined phases of said photoconductive drum to render the stroke data at high resolution.

17. The printer of claim 16, wherein the stroke data is rendered at each pixel by reflecting light onto less than all phases of the pixel.

18. The printer of claim 16, wherein said processor is further operable to identify data as stroke or contone data by determining whether the location of the data is inside an edge or on the edge of an object to be printed, and identifying the data as contone if inside the edge and stroke if on the edge.

19. The printer of claim 16, wherein said processor is further operable to perform anti-aliasing on the stroke data.

20. The printer of claim 16, and further comprising a memory containing lookup tables, said lookup tables accessed by said processor to control said individual elements to render the contone and stroke data.

* * * * *